April 24, 1962     E. B. JACOBSON     3,030,821
REMOTE CONTROLLED APPARATUS
Filed Dec. 3, 1958     4 Sheets-Sheet 1

INVENTOR.
EDWIN B. JACOBSON
BY
Woodhams Blanchard & Flynn
ATTORNEYS

April 24, 1962 E. B. JACOBSON 3,030,821
REMOTE CONTROLLED APPARATUS
Filed Dec. 3, 1958 4 Sheets-Sheet 2

INVENTOR.
EDWIN B. JACOBSON
BY
Woodhams Blanchard & Flynn
ATTORNEYS fig. 5 fig. 6 fig. 7 fig. 8

INVENTOR.
EDWIN B. JACOBSON
BY
ATTORNEYS

United States Patent Office 3,030,821
Patented Apr. 24, 1962

3,030,821
REMOTE CONTROLLED APPARATUS
Edwin B. Jacobson, Grand Rapids, Mich., assignor to Jervis Corporation, Grandville, Mich., a corporation of Michigan
Filed Dec. 3, 1958, Ser. No. 777,887
24 Claims. (Cl. 74—501)

This invention relates in general to a remotely adjustable rearview mirror and, more particularly, to a type thereof which is adapted for use with an automotive vehicle and has mechanism by which the reflective member is remotely controlled for movement into, and holding in, a variety of different positions with respect to its supporting structure.

The need for an adjustable rearview mirror having mechanism whereby adjustment of the reflective member can be remotely controlled has long existed, particularly in connection with automotive vehicles. This need has been especially apparent for larger vehicles, such as trucks, where rearview mirrors within the cab are often impractical, but has also been apparent in passenger vehicles when it is desired to mount the mirror at a location which is beyond the normal reach of the driver of the vehicle, such as on a fender.

The several advantages of a remotely adjustable rearview mirror for motor vehicles are well understood and are, together with the problems incident to the designing of such rearview mirrors, set forth in detail in patent application Serial No. 699,607, now Patent No. 2,931,245 assigned to the assignee of this application. Primary among these problems is the high cost of the somewhat complicated mechanism normally used in previously known devices, particularly where gearing systems, electrical systems or hydraulic systems are involved. Further among such problems is the necessity for resisting movement of the mirror in response to vibrations of the vehicle but without rendering the control apparatus so stiff that it will be difficult for the operator to operate.

In a continuing effort to improve upon the construction of rearview mirrors of the remotely adjustable type, a variety of further constructions for this purpose are disclosed herein, which constructions are directed primarily to the provision of simple but effective mechanism whereby the reflective member of the rearview mirror assembly is supported and adjusted by remotely controllable means.

Accordingly, a primary object of this invention has been the provision of a rearview mirror of the remotely adjustable type wherein the structure and mechanism by which said reflective member is positioned with respect to the base, such as an automotive vehicle, upon which said structure is mounted, is of minimum complexity, is of minimum cost, is easy and foolproof in operation and requires little or no maintenance even under conditions of continuous and rigorous usage.

A further object of this invention has been the provision of a supporting structure and positioning mechanism for an adjustable rearview mirror, as aforesaid, which can be combined with a relatively simple and inexpensive manually operable, remote control device, which can be placed at a very substantial distance from the reflective portion of said mirror structure and wherein the connection between said control device and said reflective portion is mechanical and requires no auxiliary power.

A further object of this invention has been the provision of a rearview mirror of the remotely adjustable type, which can be easily adapted to a variety of uses, and which can be easily installed upon a vehicle either at the time of its initial construction or at a later date.

A further object of this invention has been the provision of a rearview mirror construction, as aforesaid, which is pleasing in appearance, which creates no interference with the normal operation of the vehicle with which it is associated and which is in no way dependent for its operation upon the proper functioning of such vehicle.

A further object of this invention has been the provision of a rearview mirror construction, as aforesaid, which utilizes a basic organization of such nature that it can be expressed in a wide variety of specific designs as needed to meet varying cost and performance requirements and to facilitate the use of a wide variety of external designs.

Other objects and purposes of this invention will become apparent to persons familiar with this type of equipment upon reading the following specification and examining the accompanying drawings in which.

For convenience in description, the terms "upper," "lower" and derivatives thereof will have reference to the rearview mirror assemblies embodying the invention and disclosed herein when in their customary position of use, as shown in FIGURES 2, 5, 7 and 9, for example. The terms "front," "rear" and derivatives thereof will have reference to the normal direction of movement of the vehicles upon which said mirrors are mounted under normal conditions of use, which will be the leftward and rightward ends, respectively, of said assemblies as appearing in FIGURES 1 and 2, for example. The terms "inner," "outer" and derivatives thereof will have referece to the geometric center of said rearview mirror assemblies and the parts thereof.

General Description

The objects and purposes of the invention, including those set forth above, have been met by providing a remotely adjustable rearview mirror assembly comprised of a slave or controlled unit including a reflective member and a master or controlling unit remotely disposed with respect to the slave unit and including a manually moveable element for effecting adjustment of the reflective member. The controlled unit includes a base member which is secured to structure, such as an automotive vehicle, with which the mirror assembly is associated, and is usually located externally of the operator's compartment. A rearwardly opening hood is supported upon the base member, and the reflective member is mounted within the hood for movement about at least two transverse axes lying substantially within a plane parallel with the reflective surface.

The reflective member is connected to the controlling unit by at least two elongated, flexible elements whereby the movement of said reflective member about said axes can be remotely effected. Resilient means associated with either or both of the reflective member and the controlling unit tend to maintain a continuous force, usually tensile but in some forms compressive, upon the flexible control elements, which are preferably fabricated from materials capable of resisting the force applied with only negligible deformation. The flexible elements are disposed substantially throughout their length snugly and slidably within casing means which is fabricated from materials also capable of resisting substantial lengthwise compression with only negligible deformation. Accordingly, the resilient means maintains tension upon the flexible elements by tending to move their opposite ends apart, and the casing means, whose ends are held against following the flexible elements, are usually held under some compression. This provides substantial friction between the flexible elements and said casing means, each friction tends to prevent accidental movement of the reflective member and, therefore, tends to hold said reflective member in any position in which it is placed by operation of the controlling unit.

Detailed Construction

The rearview mirror assembly 10 (FIGURES 1 and 2) has been selected to illustrate one preferred embodiment of the invention, which will be described in detail. FIGURES 5, 7, 9, 11, 13 and 15 illustrate other embodiments of the invention which will be described briefly for the purpose of disclosing at least some of the modifications and alternate structures in which the concepts of the invention can be embodied.

The rearview mirror assembly 10 (FIGURE 2) includes a base member 11 having a central opening 14 and comprising a mounting plate 12 and an upstanding pedestal 13, which is preferably integral with the mounting plate. A rearwardly opening, cup-shaped hood 16 having a front end wall 17 is mounted upon a circular flange 18 at the upper end of the pedestal 13 by means such as screws 19. The hood 16 includes a circular, rearwardly expanding side wall 22, which is preferably integral with the front end wall 17 and, in this particular embodiment, has a rearward edge 23 which defines a plane disposed at an angle to the front wall 17. Thus, the reflective member 24 disposed within the hood 16 can be seen from a small angle on that side of the mirror assembly 10 toward which the edge 23 slopes. The position of the hood 16 can be changed, as indicated by the broken lines 16a in FIGURE 1, by removing the screws 19, rotating the hood 16 about its central axis and then replacing the screws 19.

The front end wall 17 has a thickened central portion 26 including an integral, rearwardly extending pivot projection 27 (FIGURES 2, 3, and 4) which extends out of said central portion 26 near the center thereof. The rearward end of the pivot projection 27 has a hemispherical surface which is preferably, but not necessarily, located along the axis of the circular wall 22. The central portion 26 has a pair of straight bore, parallel openings 28 and 29 the axes of which are parallel with and equally spaced from the central axis of said circular wall 22, and are located on diametrically opposite sides thereof. In this particular embodiment, the openings 28 and 29 are disposed directly above and below, respectively, the pivot projection 27.

Figures 2, 3, 4:
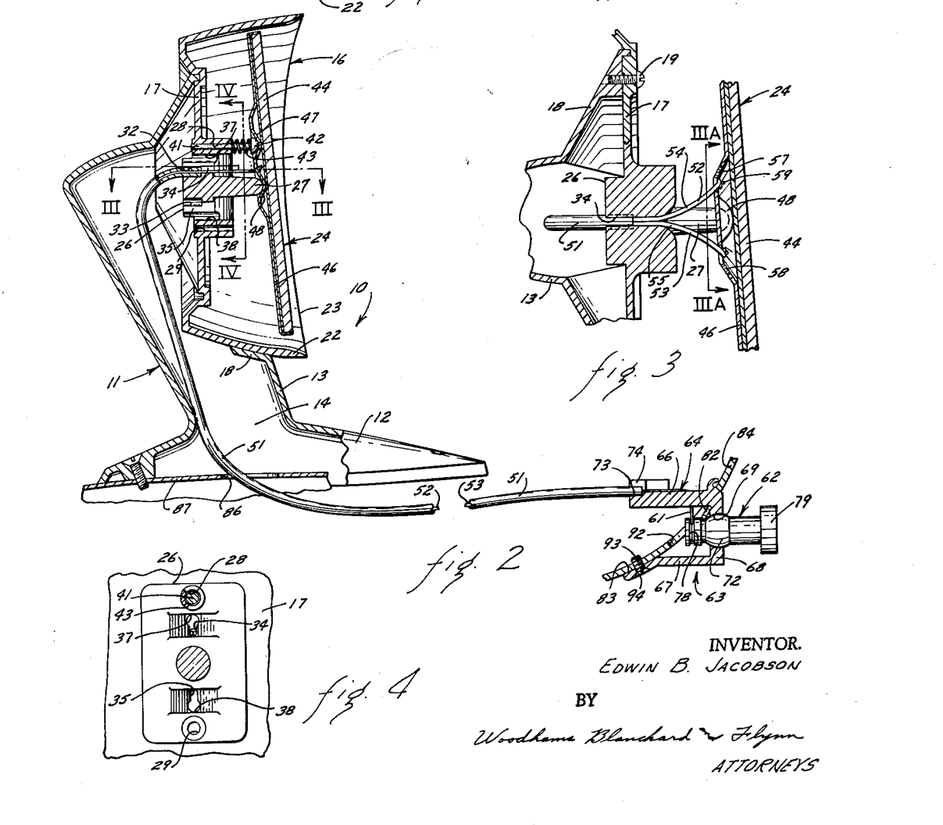
FIGURE 2 is a sectional view substantially as taken along the line II—II in FIGURE 1.
FIGURE 3 is a broken sectional view taken along the line III—III in FIGURE 2.
FIGURE 4 is a sectional view taken along the line IV—IV in FIGURE 2.

The central portion 26 (FIGURE 2) has a pair of parallel cable recesses 32 and 33 in its front side which are disposed adjacent to the pivot projection 27 on opposite sides thereof along the center line between the openings 28 and 29. A pair of cable slots 34 and 35 extend through the central portion 26 from the front side to the rear side thereof between the pivot projection and the openings 28 and 29 so that they communicate with the casing recesses 32 and 33, respectively. The slots 34 and 35 (FIGURE 4) are substantially narrower at their front ends than the casing recesses, but are flared sidewardly, as shown in FIGURE 3, at their rearward ends to act as cable guides. The slots 34 and 35 have enlargements 37 and 38 of circular cross-section near to the openings 28 and 29 but spaced therefrom toward the pivot projection 27, said enlargements being axially parallel with said pivot projection 27, and spaced from the casing recesses 32 and 33.

A pressure pin 41 (FIGURE 2) is slidably disposed within either of the openings 28 and 29, here the upper openings 28, and has an enlarged head 42 which has a hemispherical surface on its rearward end. Resilient means, such as the spiral spring 43, is sleeved upon the pin 41 between the head 42 and the central portion 26 of the end wall 17.

The reflective member 24 is comprised in this embodiment of a substantially conventional, coated glass mirror 44 supported upon a backing plate 46. Said backing plate 46 is distorted to form pin and pivot recesses 47 and 48, respectively, which are spaced from each other a distance substantially equal to the distance between the pressure pin 41 and pivot projection 27. The inner ends of the recesses 47 and 48 are preferably shaped to form a portion of a sphere for smooth pivotal engagement by the head 42 and rearward end of the pivot projection 27, respectively. The pivot recess 48 is preferably disposed at the center of the backing plate 46 in this particular embodiment where the pivot projection 27 is located along the axial center line of the hood 16.

A cable casing 51 is slidably, but snugly, received into the upper casing recess 32 and a pair of elongated and flexible control elements or cables 52 and 53 are snugly but slidably received through the cable casing 51. The front end portions 54 and 55 of said cables 52 and 53 extend beyond the front end of the casing 51, which is received into the recess 32, and thence through the cable slot 34 beyond the rear end of the central portion 26. As shown in FIGURES 2 and 3, the end portions 54 and 55 of the cables 52 and 53 are secured to the backing plate 46 at spaced points thereon, which points are preferably on opposite sides of, and equi-distant from, the center line between the recesses 47 and 48 in the backing plate 46.

In this particular embodiment, the backing plate 46 (FIGURE 3) has a pair of keyhole-shaped slots 57 and 58 (FIGURE 3A) which are on opposite sides of, and are equi-distant from the center line between the recesses 47 and 48. The small ends of said slots 57 and 58, which are just wide enough to pass the cables 52 and 53, are adjacent to each other. The end portions 54 and 55 have enlargements 59, or other distortions, which will pass through only the large portions of the slots 57 and 58. The slots 57 and 58 are preferably on a line which intersects perpendicularly the center line between the recesses 47 and 48 at a point approximately midway therebetween.

Simultaneous frontward or rearward movement of the cables 52 and 53 will effect a pivotal movement of the reflective member 24 around a horizontal axis. Forward movement of one of said cables 52 and 53 accompanied by a corresponding rearward movement of the other cable will effect a pivotal movement of the reflective member 24 around a substantially vertical axis. Combinations of these movements of said cables can be used to pivot the reflective member 24 around an axis parallel with any diameter of the mirror 44.

Figures 1, 3A:
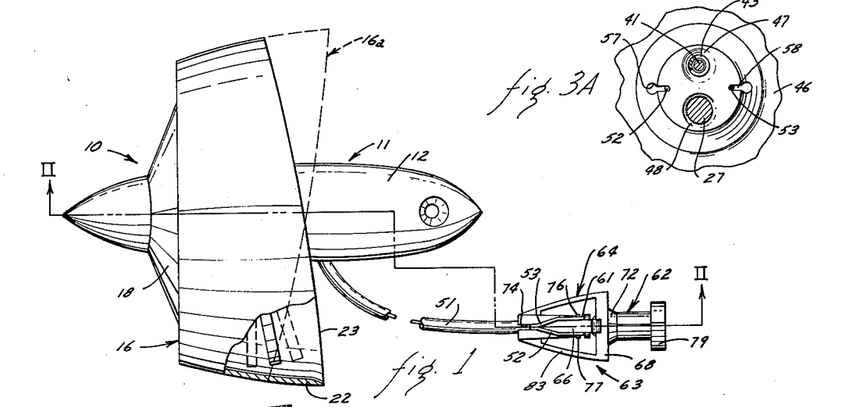
FIGURE 1 is a broken top plan view of a remotely adjustable rearview mirror assembly embodying the invention.
FIGURE 3a is a sectional view taken along the line IIIA—IIIA— in FIGURE 3.

In this particular embodiment, the cables 52 and 53 are the two halves of a single cable having substantially midway between its ends a loop 61 which is engaged by the actuating element 62 of the remotely disposed manual control 63 (FIGURES 1 and 2). The manual control 63 includes a substantially U-shaped mounting bracket 64 having a guide arm 66 and a mounting arm 67 which are secured to a pivot plate 68 and extend therefrom in substantially the same direction. The pivot plate 68 has a circular opening 69, the wall of which defines a portion of a sphere. The actuating element 62 is preferably circular in cross-section and has between its ends an enlarged pivot portion 72 which defines a portion of a sphere and which is snugly and pivotally disposed within the pivot opening 69 in the pivot plate 68.

The guide arm 66 (FIGURES 1 and 2) has in the end thereof remote from the pivot plate 68 a casing recess 73 which communicates with a rearwardly diverging cable slot 74 of less width near its front end than the casing recess 73. The guide arm 66 has a pair of downwardly and rearwardly curving guide surfaces 76 and 77 on the opposite sides thereof over which the rearward portions of the cables 52 and 53, adjacent to the loop 61, can be guided downwardly around the guide arm 66. The loop 61 is snugly receivable into an annular groove 78 in the actuating element 62 near its front end. The rear end of the cable casing 51 is snugly but slidably receivable into the casing recess 73. The actuating element 62 has an enlarged, manually engageable knob 79 at its rearward end.

The spiral spring 43 tends to urge the mirror in a clockwise (as seen in FIGURE 2) direction around the pivot projection 27, and this pulls the cables 52 and 53 through the casing 51 toward the reflective member 24, thereby tending to pivot the front end of the actuating element 62 upwardly. A spring 82 is disposed between the front end of the actuating element 62 and the guide arm 66 to oppose this tendency without materially preventing such movement if positively effected by a movement of the actuating element 62. The friction between the cables 52 and 53 and the wall of the surrounding casing 51 overcomes the effect of said springs 43 and 82 sufficiently that the parts will stay in whatever position they are placed by actuation of the element 62. The mounting bracket 64 (FIGURE 2) has a mounting surface 83 which in this embodiment is curved for snug engagement with a curved dash panel 84.

The cables 52 and 53 are made from materials which are preferably resiliently flexible and capable of withstanding the application of a substantial amount of tensile force without appreciable change in length, particularly under the conditions of operation which are likely to be imposed by their use in the mirror assembly 10. The casing 51 is preferably fabricated from a material which has a very high resistance to lengthwise compression. Accordingly, the springs 43 and 82 operate primarily to maintain a substantially constant tension upon those portions of the cables 52 and 53 which are adjacent to the reflective member 24 and actuating element 62.

*Assembly and Operation*

Having selected a particular use and location for the mirror assembly 10, the base member 11 is mounted so that the central opening 14 therethrough communicates with a corresponding opening 86 in means, such as the fender 87 of a vehicle, upon which the base member 11 is mounted. The flexible control elements 52 and 53 and their surrounding casing 51 are inserted through the openings 14 and 86, and the front end of the cable casing 51 is slidably received through the enlargement 37 in the cable slot 34. The hood 16 is positioned upon the pedestal 13 in the desired position and secured thereto by the screws 19. The enlargements 59 on the front end portions 57 and 58 of the control elements 52 and 53, respectively, are then inserted through the large, outer ends of the slots 57 and 58 (FIGURE 3A) in the backing plate 46. The flexible elements 52 and 53 are then moved toward each other so that they are locked in place within the narrow ends of the slots 57 and 58.

The pressure pin 41 with the spiral spring 43 sleeved thereon is placed within the opening 28 and the cable casing 51 is then slid rearwardly, if necessary, along the control elements 52 and 53 away from the reflective member 24 until said casing leaves the enlargement 37 and can then be moved downwardly for forward insertion into the casing recess 32 while the cables 52 and 53 remain in the slot 34.

An appropriate opening 92 is provided in the dash panel 84 for reception of the guide arm 66 and the front end of the actuating element 62. The rearward end of the casing 51 and the loop 61 between the control elements 52 and 53 is passed through the opening 92. The guide arm 66 is inserted through the loop 61 after which the elements 52 and 53 are dropped into the slot 74. The cables and casing 51 are then moved rearwardly together, compressing the spiral spring 43, so that the rearward end of the casing 51 is inserted into the casing recess 73 in the front end of the guide arm 66, the portions of the control elements 52 and 53 adjacent to said loop 61 pass along opposite sides of the guide arm 66 on the guide surfaces 76 and 77 and the loop 61 moves downwardly with respect to the guide arm 66. The front end of the actuating element 62 is now pivoted upwardly and the loop 61 is slipped over the front end thereof to be received into the annular groove 78. The spring 82 may now be inserted in place within the manual control 63 after which said control is mounted upon the dash panel 84 by means such as the screw 93 extending through screw opening 94 in the mounting arm 67. The location of the knots 59 on the front ends 57 and 58 of the control elements are carefully selected so that the correct tension will be placed upon the control elements 52 and 53 after the assembly is completed, as set forth above.

Operation of the mirror assembly 10, including the manual control 63, will be apparent from the above disclosure of the construction and assembly thereof. Briefly if the knob 79 on the actuating element 62 is moved upwardly, thereby moving the front end of the element 62 downwardly, the control elements 52 and 53 will be moved simultaneously rearwardly, whereby the reflective member 24 will be pivoted around a horizontal axis passing through the rear end of the pivot projection 27 so that the upper end of said reflective member will be moved frontwardly. In effecting such movement, the compression of the spiral spring 43 will be increased and the compression of the spring 82 will be decreased. However, the frictional engagement between the casing 51 and the control elements 52 and 53 will overpower said springs 43 and 82, and will tend to hold said elements, hence the reflective member 24 to which they are secured, in any selected position in which they are placed. When it becomes desirable to pivot the reflective member 24 in the opposite direction around said horizontal axis, the actuating element 62 is pivoted so that its front end moves upwardly, thereby causing the control elements 52 and 53 to move through the casing 51 toward the reflective member. In so doing, the spring 82 is placed under increased stress and the spiral spring 43 along with the pushing action of the control elements 52 and 53, moves the upper end of the reflective member 24 rearwardly.

Pivotal movement of the reflective member 24 around a vertical axis through the rearward end of the pivot projection 27 is effected by rotating the actuating element 62 whereby the engagement between the element 62 and the loop 61 causes one of the control elements 52 and 53 to move forwardly and the other element to move rearwardly. Accordingly, it will be seen that by a combination of pivotal and rotary movement of the actuating element 62, the reflective member 24 can be pivoted around an axis parallel with any diameter thereof, thereby providing a simple, remote control over the reflective member 24.

Dismantling of the mirror assembly is effected quickly and easily without any damage thereto by reversing the procedure whereby assembly is effected. That is, the manual control 63 is disengaged from the dash panel 84, the loop 61 is disengaged from the actuating element 82 and the reflective member 24 is withdrawn from the hood 16 and disconnected from the control elements 52 and 53. Such disassembly, which may be for the purpose of replacing a damaged part or moving the mirror assembly to a different location, can be accomplished quickly and easily.

*Alternate Constructions*

Referring to the manual control 63, shown in FIGURE 2, it will be seen that a lateral pivotal movement of the actuating element 62 will apply a pull onto the elements 52 and 53 and hence will tend to pivot the reflective member 24 around both horizontal and vertical axes. Thus, it may be desirable under some circumstances to confine the pivotal or rocking movement of the actuating element 62 within a substantially vertical plane. In such case, in order still to permit rotation of the portion containing the groove 78, the knob 79 may be connected to said portion by a coaxial shaft, not shown, which extends through and is rotatably supported by the pivot portion 72 of said actuating element 62.

Figure 5:
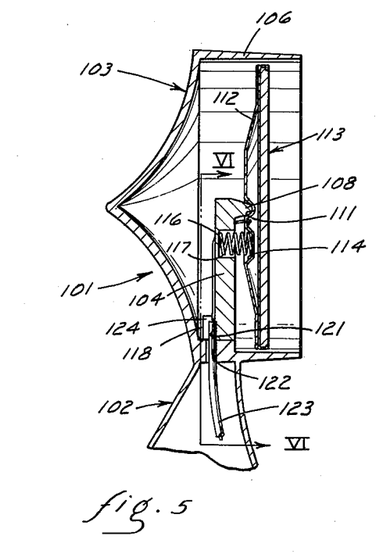
FIGURE 5 is a fragment of a central cross-sectional view of an alternate construction for a remotely adjustable rearview mirror assembly embodying the invention.
Figure 6:
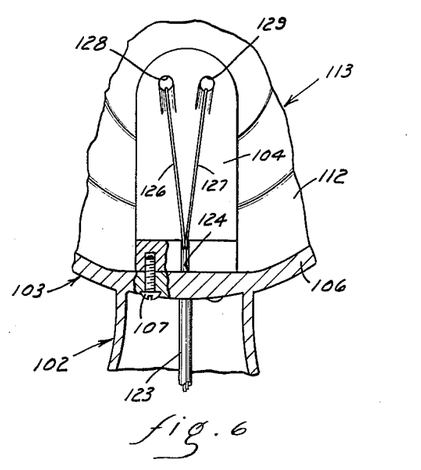
FIGURE 6 is a broken sectional view substantially as taken along the line VI—VI in FIGURE 5.
Figure 7:
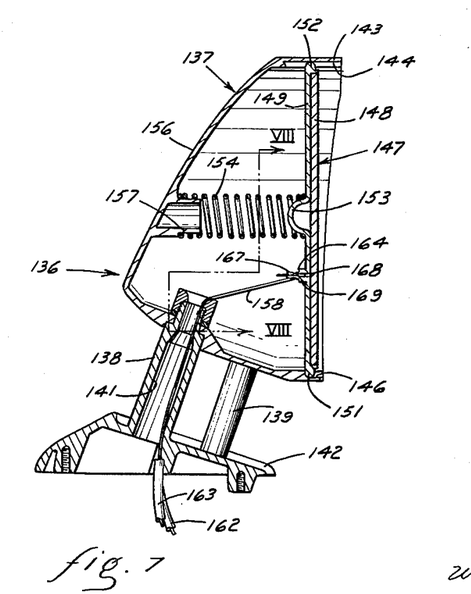
FIGURE 7 is a central cross-sectional view of another alternate construction for a remotely adjustable rearview mirror embodying the invention.

FIGURES 5 and 6 illustrate an alternate mirror assembly 101 including a base member 102, a rearwardly opening hood 103 supported upon said base member, and an upright post 104 which is secured to the radial sidewall 106 of said hood 103 near its lower surface by means such as the screws 107. The post 104 has near its upper end a rearwardly extending pivot projection 108 which has a hemispherical surface on its rearward end for snug pivotal reception into a corresponding pivot recess 111 in the backing plate 112 of the reflective member 113. Said backing plate 112 also has a spring recess 114 which is spaced downwardly from the pivot recess 111 and is directly opposite a corresponding spring recess 116 in the rearward side of the post 104. A spiral spring 117 is disposed within and between said recesses 114 and 116.

The post 104 has near its lower end a frontwardly projecting flange 118 with a downwardly opening casing recess 121 in its lower surface which recess communicates with a casing opening 122 through the adjacent portion of the hood sidewall 106. A cable casing 123 is snugly but slidably receivable into the casing recess 121 which communicates with a narrow cable slot 124 in said flange 118. A pair of control elements or cables 126 and 127 are snugly and slidably disposed within the cable casing 123 and extend upwardly therefrom through the slot 124 and along the front surface of the post 104. A pair of spaced cable openings 128 and 129 are provided through the upper end of the post 104 between the projection 108 and the spring recess 116 on opposite sides of a centerline between said projection and spring recess. The lower surfaces of the walls defining the cable openings 128 and 129, are curved downwardly and frontwardly to guide the cables 126 and 127 around the 90 degree turn.

The cables 126 and 127 are connected to the backing plate 112 of the reflective member 113 at spaced points thereon which are located substantially along the perpendicular bisector of the centerline between the pivot recess 111 and spring recess 114. The connection of the cables 126 and 127 to said backing plate may be effected in substantially the same manner as set forth above with respect to the cables 52 and 53 and the backing plate 46. The cables 126 and 127, which may be substantially similar to the cables 52 and 53, are held under tension by means including the spring 117 and are connected to a manual control device which is spaced from the reflective member 113 and which may be substantially similar to the manual control 63 shown in FIGURES 1 and 2.

The position of the reflective member 113 is controlled by moving the cables 126 and 127 in a manner substantially identical to that set forth above with respect to the movement of the cables 52 and 53 in the rearview mirror assembly 10.

Figure 8:
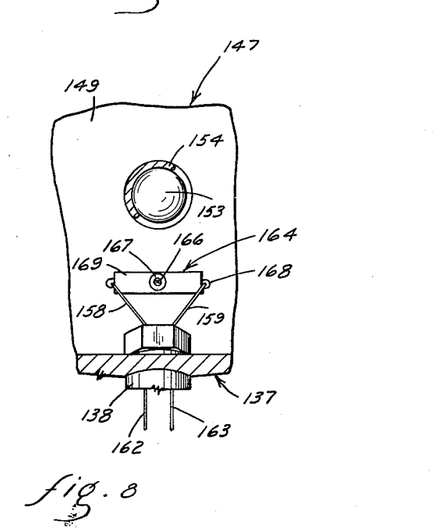
FIGURE 8 is a sectional view taken along the line VIII—VIII in FIGURE 7.

The alternate mirror assembly 136 (FIGURES 7 and 8) is comprised of a rearwardly opening hood 137 supported upon a plurality of posts 138 and 139, at least one of which, here the post 138, has a passageway 141 therethrough, which communicates with the interior of the hood 137. The posts 138 and 139 are connected at their lower ends to a mounting member 142 whereby said mirror assembly 136 may be supported upon structure, such as the body of a vehicle, not shown. The rearwardly extending, preferably circular sidewall 143 of the hood 137 has in its inner surface a pair of diametrically disposed, upper and lower grooves 144 and 146, respectively, which extend parallel with the axis of the sidewall 143.

A reflective member 147 (FIGURE 7), which is circular in this particular embodiment for cooperation with the circular hood 137, is comprised of a mirror 148 and backing plate 149 which are disposed within the hood 137. A downwardly extending lower pivot projection 151 extends from the lowest point of the backing plate and is positioned within the front end of the pivot groove 146 for pivotal movement with respect to said hood. An upper pivot projection 152, similar to said lower pivot projection 151, is secured to the backing plate 149 and extends upwardly therefrom for sliding and pivotal reception into the guide groove 144. Thus, the reflective member 147 can be pivoted around a vertical axis defined by the upper and lower pivot projections 151 and 152, and around a horizontal axis passing through the lower pivot projection 151, or any combination of movements involving these two pivot axes.

The backing plate 149 (FIGURE 7) has a frontwardly extending spring guide 153, preferably located at the center thereof for reception into one end of a spiral spring 154. The front wall 156 of the hood 137 has a rearwardly extending spring guide 157 preferably of circular cross-section and coaxial with the spring guide 153 on the reflective member 147. The spiral spring 154 is sleeved upon spring guide 157 and is normally held under compression between the front wall 156 and the reflective member 147.

A pair of cables or control elements 158 and 159 are disposed within cable casings 162 and 163, respectively, which extend up through the mounting member 142 into the passageway 141 in the post 138. The cables 158 and 159 extend beyond the upper end of the passageway 141 for connection to the reflective member 147, which may be integral with the backing plate 149, by means of a substantially T-shaped bracket 164 said plate 149 has a long slot 168 adjacent to, and extending beyond the ends of, the flange 169 on the bracket 164. The stem 167 of said bracket has an opening 166 which communicates with said slot 168. The front ends of the cables 158 and 159 are inserted into the opposite ends of the slot 168 and then forwardly through the opening 166 in the stem 167 after which diametrically opposite sides of the stem 167 are compressed toward each other to grip the cables 158 and 159. The bracket 164 may be a separate part, which is secured on the backing plate 149 in any conventional manner, as by brazing or welding. The bracket 164 is preferably arranged so that the flange 169 thereof is preferably intersected about midway between its ends by the centerline between the spring guide 153 and pivot projection 151.

The other ends of the cables 158 and 159 may be secured to and movable by the actuating element of a manually controlled device, which may be substantially similar to the manual control 63 shown in FIGURES 1 and 2. Accordingly, by moving the cables simultaneously through and along the post 138, the reflective member 147 is pivoted around the horizontal axis through the lower end of the pivot projection 151. By moving the cables 158 and 159 in opposite directions through the post 138, the reflective member 147 is pivoted about a diameter of said reflective member passing through the pivot projections 151 and 152. Various combinations of both pivotal movements can be effected in order to place the mirror 148 in many different positions which provide the alternate mirror assembly 136 with the desired adjustability. The guide groove 144 serves to prevent lateral movement of the reflective member 147 during the above-described adjustment thereof.

The alternate rearview mirror assembly 176 (FIGURES 9 and 10), is comprised of a rearwardly opening hood 177 supported upon a pedestal 178 which may be secured to a support, such as a vehicle, not shown. The hood 177 has a substantially circular, rearwardly extending side wall 179 within which a reflective member 181 is disposed. The hood 177 has an integral front wall 180 including a rearwardly extending pivot projection 182 having a substantially hemispherical surface on its rearward end which is disposed somewhat below the central axis of the circular sidewall 179. The reflective member 181 includes a mirror 183 supported upon a backing plate 184 having an eccentric pivot recess 186 into which the rearward end of the pivot projection 182 is pivotally received. The backing plate 184 has an integral forward projection 187 engaged by one end of a spiral spring 188, the other end of which is connected to the front wall 180 just above the pivot projection 182. The spring 188 is held under tension between the reflective member 181 and said front wall 180.

A pair of horizontal spaced bosses 191 and 192 are integral with, and extend rearwardly from, the front wall 180 on opposite sides of and above the projection 182. Casing openings 193 and 194 are provided through the bosses 191 and 192 so that they open rearwardly at points located on opposite sides of, and equidistant from, the vertical diameter of the reflective member 181. The spring projection 187 is preferably located along this vertical diameter and below a line connecting the element recesses 196 and 197 in the backing plate 184. At least the forward end portions of the flexible control elements 198 and 199 are relatively stiff and are snugly and removably received into said recesses 196 and 197, respectively.

The control elements 198 and 199 are disposed within casings 202 and 203, respectively, the forward ends of which are slidably received into the casing recesses 193 and 194. The forward ends of the casings 202 and 203 are flared for reception into annular grooves 200 and 201 in the casing openings 193 and 194, respectively, adjacent to but spaced from the rearward ends thereof, thereby resisting lengthwise movement of the casings with respect to the front wall 180 of the hood 177. The control elements 198 and 199 are fabricated from material which strongly resists forces tending to alter the length of said control elements. The elements 198 and 199 and the casings 202 and 203 extend through a passageway 204 in the pedestal 178 for the purpose of connection to a manual control, which may be substantially identical to the manual control 63 shown in FIGURES 1 and 2. In this instance, the flexible elements 198 and 199 are held under a constant resilient compressive force and the casings may be under either tension or compression depending upon the specific details of their mounting.

The alternate rearview mirror assembly 211 (FIGURES 11 and 12) is comprised of a rearwardly opening hood 212 supported upon a pedestal 213 having a passageway 214 communicating with the interior of the hood 212. The front wall 216 of the hood 212 has a rearwardly extending boss 217 which in turn has a rearwardly facing pivot recess 218 defining a portion of a sphere which is preferably located eccentrically of the hood 212.

Figures 9, 10, 11, 12:
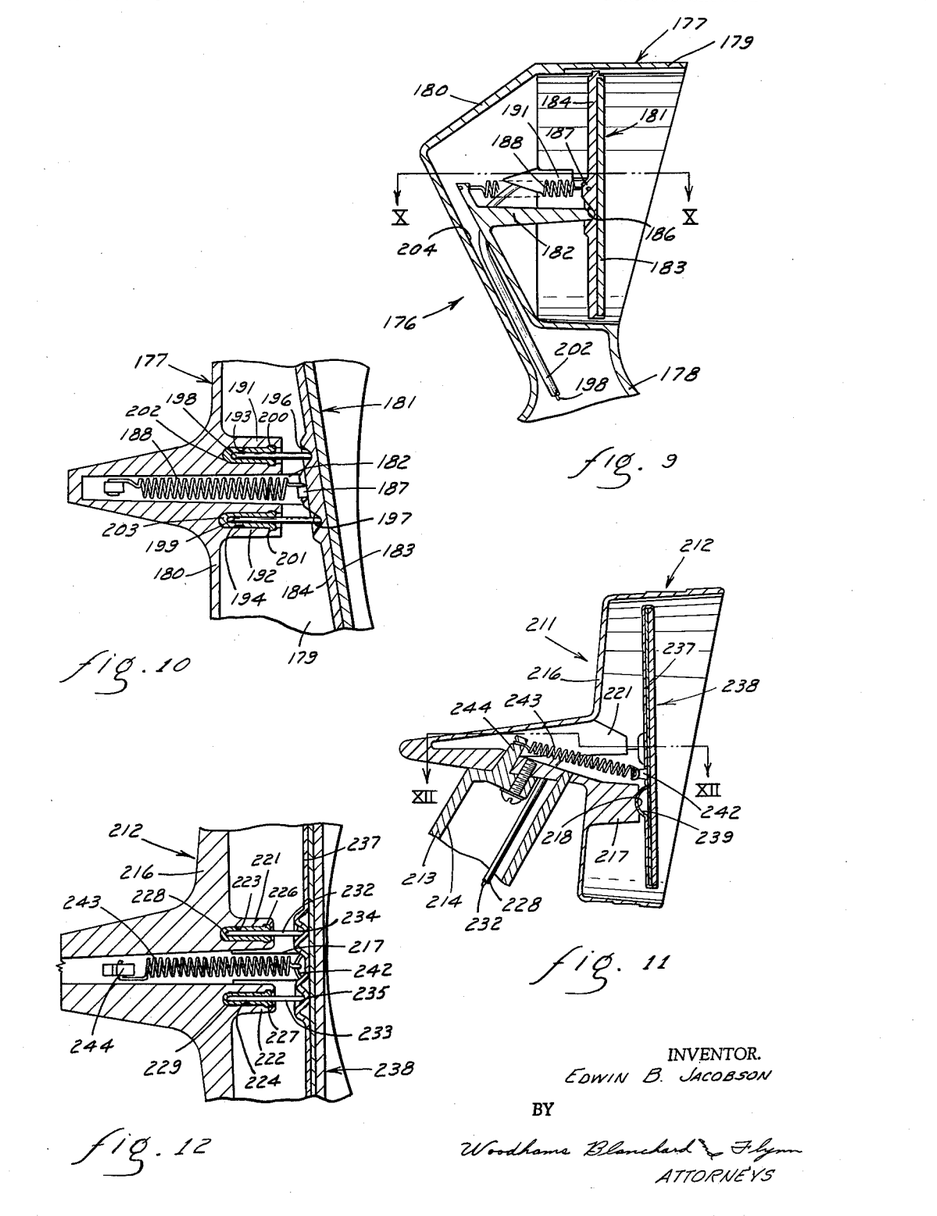
FIGURE 9 is a fragmentary central cross-sectional view of a remotely adjustable rearview mirror embodying the invention.
FIGURE 10 is a sectional view taken along the line X—X in FIGURE 9.
FIGURE 11 is a fragmentary central cross-sectional view of another alternate structure for a remotely adjustable rearview mirror embodying the invention.
FIGURE 12 is a sectional view taken along the line XII—XII in FIGURE 11.

The front wall 216 of the hood 212 is also provided with a pair of spaced, rearwardly extending bosses 221 and 222 through which casing openings 223 and 224 are provided. The casing openings have annular grooves 226 and 227 in their rearward ends into which the flared ends of the cable casings 228 and 229 are received for resisting lengthwise movement of the cable casings with respect to the hood 212. A pair of elongated, flexible control cables or elements 232 and 233 are slidably and snugly disposed within the cable casings 228 and 229 and extend through the rearward ends of the casing openings 223 and 224. Said control elements 232 and 233 have stiff end portions insertable into a pair of spaced element recesses 234 and 235 in the backing plate 237 of the reflective member 238. Said backing plate has a forwardly extending, substantially hemispherical projection 239 receivable into the pivot recess 218 when said control elements 232 and 233 are disposed within their recesses 234 and 235. The backing plate 237 has an integral loop 242 engageable by one end of a spiral spring 243, the other end of which is connected to a post 244 fixed with respect to the hood 212 and disposed forwardly of said reflective member 238. The spring 243 is under continuous tension and the loop 242 is preferably disposed about midway between the center of a line connecting the recesses 234 and 235 and the pivot projection 239.

As in the case of the alternate assembly 176 (FIGURE 9) the spring 243 urges the reflective member 238 forwardly and such urging is resisted by the adjacent ends of the control elements 232 and 233, which are selected from materials capable of resisting without appreciable deformation the compression lengthwise thereof to which it is subjected by the spring 243.

The opposite ends of the control elements 232 and 233 may be connected to a manual control substantially similar to the manual control 63 shown in FIGURES 1 and 2. By moving such manual control, the reflective member 238 can be caused to pivot both around vertical and horizontal axes through the pivot projection 239, or any combination of such movements. The alternate assembly 211 involves two-wire control generally similar to the two-wire control of the alternate assembly 176, shown in FIGURE 9.

The operation of each of the last two described alternate mirror assemblies differs from the operation of the first two described rearview mirror assemblies in that the springs associated with the reflective members thereof tend to move said reflective member forwardly and their respective control elements are in compression to oppose such movement. In the FIGURE 2 and FIGURE 5 assemblies, the springs urge the reflective member rearwardly and the control elements are in tension to oppose such movement. However, it will be observed that all of these rearview mirror assemblies utilize only two control elements for effecting control over the position and movement of the reflective members thereof.

Figures 13, 14, 15, 16:
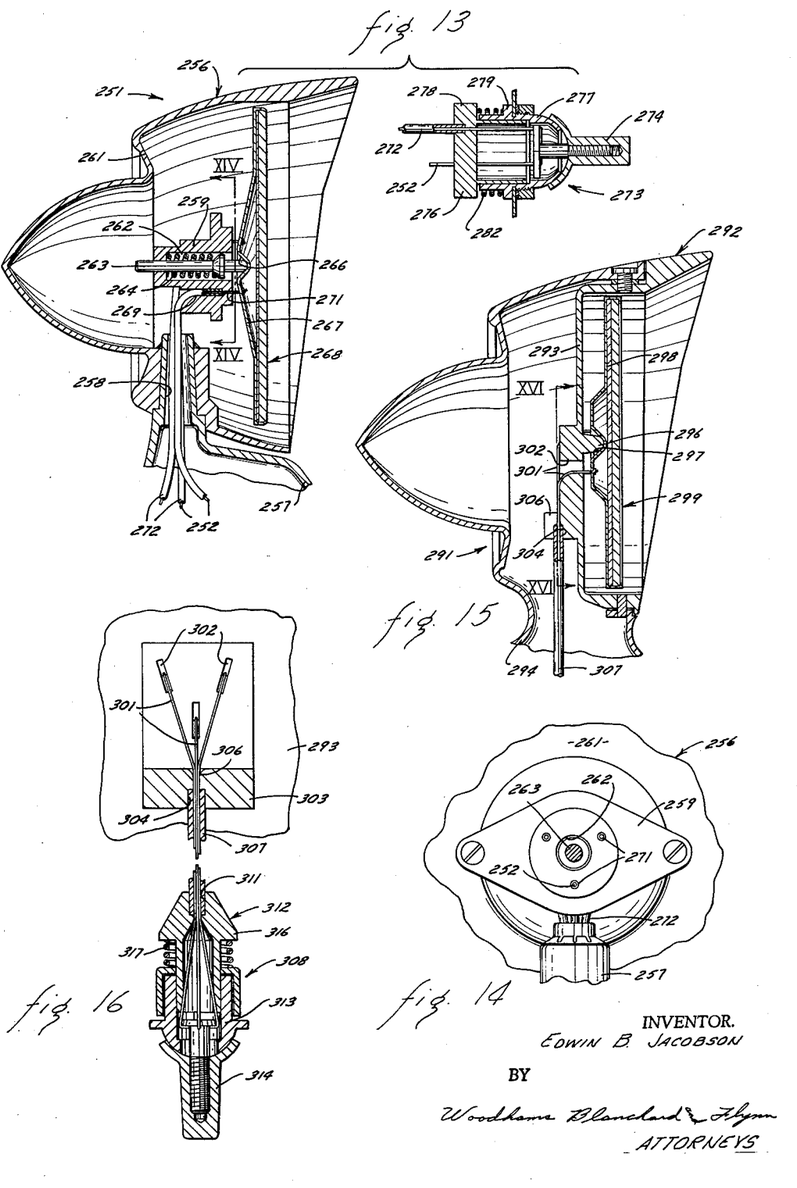
FIGURE 13 is a fragmentary central cross-sectional view of an alternate structure for a remotely adjustable rearview mirror embodying the invention.
FIGURE 14 is a sectional view taken along the line XIV—XIV in FIGURE 13.
FIGURE 15 is a fragmentary central cross-sectional view of a further alternate construction for a remotely adjustable rearview mirror embodying the invention.
FIGURE 16 is a sectional view taken along the line XVI—XVI in FIGURE 15.

FIGURES 13 and 14 disclose a fragment of an alternate rearview mirror assembly 251 embodying the invention and utilizing three elongated and flexible control elements 252. The alternate assembly 251 includes a rearwardly opening hood 256 supported upon a pedestal 257 having a passageway 258 communicating with the interior of the hood 256. A support member 259 is mounted upon the front wall 261 of the hood 256 within said hood and has a central, preferably coaxial opening 262 in which a pivot pin 263 is slidably disposed. The pin 263 is urged rearwardly by a spring 264. The rearward end of the pin 263 is hemispherical for pivotal reception into a corresponding recess 266 in the backing plate 267 of the reflective member 268. The support member 259 has three casing recesses 269 in the frontward side thereof which are axially parallel with the pin opening 262 and equally spaced from said pin opening and from each other. The control elements 252 (FIGURE 14) extend through element openings 271 in the support member 259, which openings are smaller than the casing recesses 269 and communicate between said casing recesses and the rearward surfaces of the support member 259. The ends of the control elements are secured to the backing plate 267 in any convenient manner at points spaced equidistantly from each other and from the center of the pivot recess 266 so that they register substantially with the locations of the element openings 271.

The control elements 252 are snugly and slidably disposed within element casings 272 which extend from the casing recesses 269 in said support member 259 to a manual control 273 having an actuating member 274 which is connected to the rear ends of the cables 252. The manual control 273 includes front and rear, telescoping sections 276 and 277 having external annular flanges 278 and 279 between which a spiral spring 282 is held under compression by the casings 272 and the control elements 252 disposed therein. Thus, the spring 282 and the spring 264 cooperate to hold the reflective member 268 firmly against the rearward end of the pin 263 whereby pivotal movement of the actuating member 274 effects a corresponding pivotal movement of the reflective member 268 around an axis parallel with any diameter of the reflective member 268.

For a more detailed description of the manual control 273, reference is made to application Serial No. 699,607 which is assigned to the assignee of this application and which fully discloses a manual control of this type. It will be recognized that other types of devices for manually controlling three wires, such as the manual controller shown in FIGURE 16, may be utilized for this purpose.

The alternate rearview mirror assembly 291 (FIGURES 15 and 16) also involves three-wire control and includes a rearwardly opening hood 292 having a front wall 293. Said hood 292 is pivotally supported within the upper end of a hollow pedestal 294 for limited adjustment with respect to said hood about a vertical axis passing through the center of said pedestal. A pivot projection 296 extends rearwardly preferably from the center of the front wall 293 and has a hemispherical rearward end which is pivotally receivable into a corresponding recess 297 in the backing plate 298 of a reflective member 299 disposed within the hood 292. Three control elements 301 are secured in any convenient manner at one end of each to the backing plate 298 at points spaced equidistantly from the center of the pivot recess 297 and from each other. Said control elements then extend through aligned cable openings 302 in the front wall 293, the lower walls of said openings 302 being curved frontwardly and downwardly to provide guide surfaces around which said cables are bent.

Said front wall 293 has a forwardly extending flange 303 which is spaced downwardly from the lowermost cable opening 302 and which has a casing recess 304 extending upwardly into its lower surface. Said recess 304 communicates with a cable slot 306 through which the control cables 301 may extend upwardly from the single casing 307 in which they are all snugly and slidably disposed. The cable casing 307 and its enclosed cables 301 extend from the flange 303 to a manual control 308 (FIGURE 16) which is generally similar to the manual control 273, except that it is provided with only one casing recess 311 in the front section 312 thereof. Said front section 312 is telescopically disposed within a rear section 313 upon the rear end of which the actuating member 314 is pivotally supported for movement in any direction away from a central position.

The front section 312 (FIGURE 16) has an external annular flange 316 near its front end and a spiral spring 317 is sleeved upon the front section 312 between the flange 316 and the adjacent end of the rear section 313 for the purpose of urging the front and rear sections away from each other. The cables 301 are fabricated from materials which are not appreciably stretched by the force of the compressed spring 317, and the casing 307 is fabricated from material which is not appreciably compressed by the spring 317. Accordingly, the cables 301 are held under continuous tension whereby the reflective member 299 is held snugly against the pivot projection 296 in any desired position which is selected by moving the actuating member 314.

It has been indicated hereinabove that the several hoods such as the hoods 16, 103 and 137 are at least preferably circular, as are the reflective members respectively disposed therein. However, it will be understood that the other shapes for the hood and reflective member, such as a regular polygon, may be utilized if desired within the scope of the invention.

It will be recognized from the number of alternate rearview mirror assemblies disclosed herein that further adaptations of the invention can be provided. Thus, although these particular embodiments have been specifically disclosed in detail herein for illustrative purposes, it will be understood that variations or modifications of these disclosures, which lie within the scope of the appended claims are fully contemplated.

What is claimed is:

1. A remotely controlled apparatus, comprising: a controlled member and backing means therefor; a support structure and means on said support structure and said backing means defining a universal joint mounting said controlled member for universal movement with respect to said support structure; spring means mounted on said support structure and engaging said backing means at a point thereon offset along a first axis from said universal joint for normally urging said controlled member in one direction around said joint on a second axis; a pair of longitudinally movable, flexible, elongated means connected to said backing means and located respectively on both transverse sides of said first axis and offset therefrom such a direction and distance along said first axis that a stressed condition therein will oppose said spring means and urge said backing means against said support structure and around said joint and said second axis in an opposite direction to said one direction said flexible, elongated means being engageable with said backing means and being adapted upon longitudinal movement to cause pivotal movement thereof and of said controlled member about two mutually perpendicular axes parallel with said controlled member; and control means connected to said flexible, elongated means for causing longitudinal movement thereof.

2. A remotely controlled apparatus, comprising: a controlled member and backing means therefor, said backing means being formed to provide a first part of a two-part universal joint, said first part being located directly behind said controlled member; a support structure located rearwardly from said backing means, means on said support structure defining the second part of said universal joint, said first and second parts being interfitted to define the universal joint whereby said controlled member is supported for universal movement by said joint; coil spring means bearing at one end thereof against said backing member at a point offset from said universal joint and extending rearwardly from said backing member, said spring means bearing at the other end thereof against said support structure whereby said spring means normally urges said controlled member in one direction around said joint; a pair of longitudinally moveable, elongated, actuating means extending forwardly through said support structure and engaging the rearward surface of said backing means at points offset vertically and transversely from said universal joint and said coil spring means, whereby axial movement of said actuating means will effect movement of said controlled member about said universal joint; a control member connected to said actuating means for effecting longitudinal movement thereof to thereby effect movement of said controlled member about said universal joint.

3. A remotely controlled apparatus, comprising: a support structure; a controlled member; means including a projection on one of said support structure and the other side of said controlled member pivotally engageable with a corresponding recess on the other of said support structure and other side of said controlled member, whereby said controlled member is pivotable with respect to said support structure, around at least two transverse axes defining a plane generally parallel with said controlled member; two elongated flexible elements and means securing said elements at corresponding adjacent ends thereof to said controlled member on said other side thereof at points spaced from each other and offset horizontally and vertically from the center of contact between said projection and the wall of said recess; guide means on said support structure slidably engaging and guiding said elements and spring means extending between said support structure and said controlled member and engaging said controlled member at a point offset from said center of contact and between the points at which said ends of said elements are secured to said controlled member, said spring means holding said elements under constant tension; a remote control member connected to said elements for effecting longitudinal movement thereof to effect pivoting of said controlled member with respect to said support structure.

4. A remotely controlled apparatus, comprising: a support structure; a generally planar controlled member; means including a projection on one of said support structure and said controlled member pivotally engageable with a corresponding recess on the other of said support structure and controlled member, whereby said controlled member is pivotable with respect to said support structure around at least two transverse axes defining a plane parallel with said reflective surface; two elongated flexible elements and means securing respectively adjacent ends of said elements fixedly to said other side of said controlled member at points spaced from each other and offset horizontally and vertically from the center of contact between said projection and the wall of said recess; guide means on said support structure slidably engaging and guiding said flexible elements; remote control actuating means engageable with said flexible elements at points thereon spaced a substantial distance from said adjacent ends thereof and operable to effect longitudinal movement thereof; and spring means extending between said support structure and said controlled member and engaging said controlled member at a point offset vertically from said center of contact and between the points at which said ends of said elements are secured to said controlled member, said spring means holding said flexible elements under constant tension between said controlled member and said actuating means.

5. The structure of claim 4 wherein said flexible elements are snugly surrounded by at least one elongated casing extending from said support structure to said actuating means and the relative lengths of said casing and said flexible elements is such that when said structure is in operative position, said flexible elements are under tension and said casing is under compression.

6. The sttructure of claim 4 wherein said support structure includes a substantially cup-shaped hood surrounding said controlled member, and wherein said flexible elements are snugly surrounded by at least one elongated casing extending from said support structure to said actuating means and the relative lengths of said casing and said flexible elements is such that when said structure is in operative position, said flexible elements are under tension and said casing is under compression.

7. The structure of claim 4 wherein said projection is a part of said supporting structure and has a hemispherical surface engageable with a corresponding, substantially hemispherical surface defining a recess in said controlled member, said controlled member being movable lineally toward and away from said supporting structure; and said spring means is a spring disposed between said support structure and said controlled member at a point spaced from said center of contact, said elements being secured to said controlled member at points on opposite sides of a centerline between said spring and said projection, said points defining a second line intersecting said first line substantially perpendicularly between said spring and said projection.

8. The structure of claim 4 wherein said spring means is a single spring; a plurality of elongated cylindrical casings, one of said casings snugly embracing each of said elements, said casings extending from said support structure to said actuating means and being substantially incompressible lengthwise thereof under the force applied by said spring and wherein said elements are secured with respect to said controlled member at points on opposite sides of a center line between said projection and said spring, said points defining a second line intersecting said centerline substantially perpendicularly.

9. The structure of claim 4 wherein said support structure includes a cup-shaped hood in which said controlled member is disposed; an elongated hollow casing enclosing and snugly but slidably embracing said elements, said casing extending between said support structure and said actuating means and being substantially incompressible lengthwise thereof under said tensioning and wherein said elements are secured with respect to said controlled member at points on opposite sides of and equally spaced from the centerline through said projection and said spring means, whereby said spring means urges pivotal movement of said controlled member in a direction which is opposed by said elements.

10. A remotely controlled apparatus comprising: a support structure including a mounting base, an upright pedestal and a cup-shaped hood secured to said pedestal and opening rearwardly therefrom; a substantially controlled member, said member being substantially disposed within said hood; means including a projection on one of said support structure and said controlled member pivotally receivable into a corresponding recess in the other of said support structure and controlled member, whereby said controlled member can be pivoted with respect to said support structure around at least two axes substantially perpendicular to each other and defining a plane substantially parallel with said controlled member; at least two elongated flexible elements and means securing said elements with respect to said controlled member at points spaced from each other and offset horizontally and vertically from the center of contact between said projection and the wall of said recess; a manually operable control connected to said elements at points thereon spaced a substantial distance from said controlled member; guide means on said support structure slidably engaging and guiding said elements adjacent to said controlled member; and casing means surrounding and snugly but slidably embracing said elements and extending between said support structure and said manually operable means; and spring means extending between said support structure and said controlled member and engaging said controlled member at a point vertically offset from said center of contact and substantially midway between and offset vertically from the points at which said ends of said elements are secured to said controlled member, said spring means placing said flexible elements under tension between said reflective member and said manually operable means.

11. The device defined in claim 10 wherein the relative lengths of said casing and said flexible elements is such that when said structure is in operative position, said flexible elements are under tension and said casing is under compression.

12. A remotely controlled apparatus, comprising: a support structure including an upstanding pedestal having a passageway extending therethrough and a rearwardly opening, cup-shaped hood supported upon said pedestal and having a front wall opposite the open side of said hood; a projection extending rearwardly from said front wall toward said open side along the central axis of said hood; a substantially flat, controlled member having an image reflecting surface on one side thereof and a centrally located pivot recess in the other side thereof, the free end of said projection being pivotally received into said pivot recess; a pin recess in said other side of said controlled member spaced from said pivot recess; a pressure pin slidably supported upon said front wall for movement toward and away from said controlled member along a line substantially parallel with the central axis of said hood and passing through said pin recess; first resilient means urging said pin toward said reflective member; a pair of elongated, flexible control elements secured to said other side of said controlled member at spaced points thereon located on opposite sides of the centerline between said recesses and substantially upon the perpendicular bisector of said centerline; means defining a guide opening in said front wall between said pin and said projection through which said control elements are slidably received, said guide opening communicating with said passageway; a control device spaced from said controlled member and having a body member supporting an actuating member, said actuating member being connected to said control elements at points thereon spaced substantial distances from said controlled member; casing means snugly and slidably embracing said control elements and extending from said front wall through said passageway to said control device; and second resilient means disposed between said actuating member and said body, said first and second resilient means imposing a tension upon said control elements and a corresponding lengthwise compression of said casing means.

13. A remotely controlled apparatus, comprising: a support structure including a rearwardly opening, cup-shaped hood and an integral pedestal having a passageway therethrough communicating with the interior of said hood; a support post disposed within and secured to said hood, said support post extending through the central axis of said hood; a pivot projection on said support post extending along said central axis of said hood toward the open side thereof; a substantially flat, controlled member disposed within said hood and having a controlled surface on one side thereof, the other side of said controlled member having a centrally disposed pivot recess into which the free end of said projection is pivotally received; means defining a pair of opposed spring recesses in said other side of said controlled member and in the facing side of said support post, said recesses being substantially equally spaced from said pivot recess and said projection, respectively; a first spring disposed within and extending between said spring recesses; means defining a pair of guide openings through said support post between said projection and the spring recess therein; a pair of elongated, flexible control elements extending through said guide openings, said elements being secured at adjacent ends thereof to the other side of said controlled member at spaced points thereon located on opposite sides of a first line between the center of said spring recess and said pivot recess therein, and substantially along a second line intersecting said first line perpendicularly, said guide openings being aligned with said points and said control elements extending through the passageway in said support structure; a control device spaced from said controlled member and having a body supporting an actuating member, said actuating member being connected to said control elements at points on said control elements spaced substantially equidistantly from the ends of said control elements which are secured to said controlled member; casing means snugly and slidably embracing said control elements and extending between said support post and said body of the control device; a second spring disposed between said actuating member and said body, said springs being held under compression between the ends of said control elements and the corresponding ends of said casing means.

14. A remotely controlled apparatus, comprising: a support structure including an upstanding pedestal having a passageway extending therethrough and a rearwardly opening, cup-shaped hood having a front wall and being supported upon said pedestal, the passageway in said pedestal communicating with the interior of said hood; a projection fixed upon said front wall within said hood and extending toward the open side of said hood along the central axis thereof; a substantially flat, controlled member having a reflective surface on one side thereof and a centrally disposed projection on the other side thereof; a spiral spring encircling said projections and disposed therebetween for urging said controlled member away from said front wall; pivot means near an edge of said controlled member pivotally supporting said controlled member with respect to the adjacent portion of said hood for movement about transverse axes through said pivot means; a guide groove in the inner surface of said hood and disposed substantially within a plane defined by said central axis and the center of said pivot means; a guide element on said controlled member slidably and pivotally disposed within said groove; a pair of elongated, flexible control elements extending through the passageway in said pedestal and connected at their adjacent ends to the other side of said controlled member at spaced points thereon which points are located on opposite sides of a first line between the projection on said controlled member and said pivot means, said points defining a second line intersecting said first line substantially perpendicularly; a control device spaced from said controlled member and having a body supporting an actuating member, said actuating member being connected to said control elements at points on said control elements spaced substantially equally distant from said controlled member; casing means snugly and slidably embracing said control elements and extending from said pedestal to said control device; and resilient means disposed between said actuating member and said body, said control elements being held under tension and said casing means being held under compression with respect to each other by said resilient means.

15. A remotely controlled apparatus, comprising: a cup-shaped hood having a front wall opposite the opening therein, said hood being supported upon a pedestal having a passageway therethrough communicating with the interior of said hood; a projection on said front wall within said hood extending toward the open side thereof and spaced from the central axis of said hood toward the pedestal; a substantially flat, controlled member having an image reflecting surface on one side thereof and a pivot recess in the other side thereof which is offset from the center of said controlled member a distance substantially equal to the space between said projection and said central axis; a resilient member connected to and extending between said front wall and said other side of said controlled member and near the center thereof; a guide groove in the inner wall of said hood lying substantially within a plane defined by the center of said projection and the central axis of said hood; a guide projection on the edge of said controlled member disposed in said groove for pivotal and slidable movement; a pair of spaced element recesses on said other side of said controlled member located on opposite sides of said plane, said element recesses defining a line intersecting said plane substantially perpendicularly at a point between said groove and said central axis; a pair of guide members fixed with respect to said end wall and having guide openings therethrough aligned with said element recesses; a pair of elongated, flexible control elements extending through said passageway and respectively through said guide openings into said element recesses; a control device spaced from said controlled member and having a body supporting an actuating member, said actuating member being connected to said control elements at points thereon spaced substantial distances from said controlled member; casing means snugly and slidably embracing said control elements and extending from said guide members through said passageway to the body of said control device, said control elements being held under compression with respect to each other.

16. A remotely controlled apparatus, comprising: a substantially cup-shaped hood having a front wall opposite the open side thereof and secured to a support pedestal having a passageway communicating with the interior of said hood; a first pivot projection fixed with respect to said front wall and extending toward the open side of said hood to a point spaced vertically from the central axis of said hood; a substantially flat, controlled member having an image reflecting surface on one side thereof and a second pivot projection extending from the other side thereof and spaced vertically from the center of said controlled member a distance and direction substantially equal to the distance and direction from the first pivot projection to the central axis of said hood; a resilient member secured to and between said front wall of said hood and said controlled member at a point on a first line between the second pivot projection and the center of said controlled member; a pair of spaced guide bosses on said front wall near the center thereof and having guide openings therein; a pair of spaced element recesses on said other side of said controlled member located on opposite sides of said first line and aligned with said guide openings, said element recesses being disposed substantially along a line passing through the center of said controlled member perpendicularly to said first line; a pair of elongated, flexible control elements extending through said passageway and said guide openings in said guide bosses into said element recesses, said resilient member being held under constant tension thereby with said control elements bearing under axial compression against said controlled member; a control device spaced from said controlled member and having a body supporting an actuating member, said actuating member being connected to said control elements at points thereon spaced substantial distances from said controlled member; casing means snugly and slidably embracing said control elements and extending from said guide bosses to the body of said control device.

17. A remotely controlled apparatus, comprising: a substantially cup-shaped hood having a front wall opposite the open side thereof and being supported upon a pedestal having a passageway communicating with the interior of said hood, a support member mounted upon said front wall within said hood and having a pin opening extending therethrough substantially coaxial with the central axis of said hood; a pivot pin slidably disposed within said pin opening and extending therefrom toward the open side of said hood; resilient means between said pin and said support member urging said pin away from said front wall; a substantially flat, controlled member having an image reflecting surface on one side thereof, the other side of said controlled member having a centrally disposed pivot recess into which the adjacent end of said pivot pin is pivotally received; three elongated, flexible control elements secured at corresponding ends of each to the other side of said controlled member at spaced points thereon equidistant from said pivot recess and from each other; three guide openings through said support member respectively aligned with the connection points of said control elements on said controlled member; said control elements extending, respectively, through said guide openings and through said passageway in said pedestal; a control device spaced from said controlled member and having a body portion pivotally supporting an actuating member, said actuating member being connected to said control elements at points on said respective control elements spaced substantially equal distances from said controlled member; casing means snugly and slidably embracing said control elements and extending between said support member and the body of said control device; and second resilient means disposed between said actuating member and said body member, said first and second resilient means cooperating to urge a tensioning of said control elements and compression of said casing means.

18. A remotely controlled apparatus, comprising: a substantially cup-shaped hood having a front wall opposite the open side thereof; a pedestal pivotally supporting said hood for movement about an axis substantially parallel with said front wall and passing through the central axis of said hood, said pedestal having a passageway therethrough; a projection on said front wall within said hood and extending along the central axis thereof toward the open side thereof; a substantially flat, controlled member disposed within said hood, said member having an image reflecting surface on one side and a centrally disposed pivot recess in the other side thereof, said projection being pivotally received into said recess; three elongated, flexible control elements secured near corresponding ends of each to said other side of said controlled member at spaced points thereon disposed equidistantly from said pivot recess and from each other; means defining three spaced guide openings through said front wall aligned with the connection points of said control elements on said controlled member, said control elements slidably extending through said guide openings and said passageway in said pedestal; a control device spaced from said controlled member and having a body supporting an actuating member, said actuating member being connected to said control elements at points on said respective control elements located at substantial and equal distances from said controlled member; casing means snugly and slidably embracing said control elements and extending from the front wall of said hood to the body of said control device; and resilient means disposed between and urging separation of said actuating member and said body, whereby said control elements are placed under tension said casing means is placed under lengthwise compression.

19. Remotely controlled mechanism, comprising: a controlled member and support means therefor, said controlled member and said support means including means mounting said controlled member for pivoting movement about two mutually perpendicular axes; stressed spring means mounted on said support means and acting on said controlled member at a point offset from at least one of said axes, said spring means urging said controlled member in one direction with respect to said support means; a pair of flexible, elongated elements whose corresponding ends engage said controlled member at points thereon offset on both sides of a center line extending between said spring means and the point where said axes intersect, said elements being stressed by said spring means so that said controlled member is urged in a direction opposite to said one direction by said elements; a control member connected to the other ends of said elements for effecting longitudinal movement thereof to effect pivoting of said mirror about said axes.

20. A remotely controlled mechanism according to claim 19 wherein said controlled member is mounted for pivoting movement about a horizontal axis and a vertical axis and said spring means engages said controlled member at a point on said vertical axis offset from said horizontal axis and said elements engage said controlled member at points on both sides of said vertical axis and horizontally spaced therefrom, said last-mentioned points being on the same side of said horizontal axis as said spring means.

21. Remotely controlled mechanism comprising: a controlled member and support means therefor, said controlled member and said support means including a ball and socket joint supporting said controlled member for universal movement with respect to said support means about a center point; stressed spring means mounted on said support means and acting on said controlled member at a point offset from said center point and urging said controlled member in one direction about said center point; a pair of flexible, elongated cables whose corresponding ends engage said controlled member at points thereon offset horizontally and vertically on either side of a center line extending between said spring means and said center point, said last-mentioned points also being offset along said line from said spring means and said center point, said cables being stressed by said spring means so that said controlled member is urged in a direction opposite to said one direction by said cables; a control member connected to the other ends of said cables for effecting longitudinal movement thereof to effect pivoting of said mirror about said axis.

22. A remotely controlled mechanism according to claim 21 wherein said control member includes means for simultaneously moving both cables longitudinally in the same direction in response to movement of the control member in one fashion to thereby pivot the controlled member about one axis in said opposite direction in opposition to the spring and also includes means for simultaneously moving said cables in opposite directions with respect to each other in response to movement of said control member in another fashion to thereby pivot the controlled member about a second axis transverse to said one axis.

23. A remotely controlled mechanism according to claim 21 wherein said spring means is under compression and acts on said controlled member at a point vertically spaced from said center point and said cables are under tension and are secured to said controlled member between said spring means and said center point.

24. A remotely controlled mechanism according to claim 21 wherein said spring means is under tension and is secured to said controlled member at a point vertically spaced from said center point and said cables are under compression and engage said controlled member at points on the other vertical side of said spring means from said center point.

References Cited in the file of this patent

UNITED STATES PATENTS

| | | |
|---|---|---|
| 1,270,163 | Jesurun et al. | June 18, 1918 |
| 1,499,640 | Copeland | July 1, 1924 |
| 1,570,888 | Gray | Jan. 26, 1926 |
| 1,630,217 | Rasor | May 24, 1927 |
| 2,656,764 | Johnson | Oct. 27, 1953 |
| 2,664,029 | Higgins | Dec. 29, 1953 |
| 2,855,825 | Feder | Oct. 14, 1958 |

FOREIGN PATENTS

| | | |
|---|---|---|
| 433,112 | Great Britain | Aug. 8, 1935 |

UNITED STATES PATENT OFFICE
CERTIFICATE OF CORRECTION

Patent No. 3,030,821

April 24, 1962

Edwin B. Jacobson

It is hereby certified that error appears in the above numbered patent requiring correction and that the said Letters Patent should read as corrected below.

Column 2, line 70, for "referece" read -- reference --; column 3, line 37, for "each" read -- which --; column 7, line 17, for "82" read -- 62 --; column 13, line 43, for "reflective" read -- controlled --; line 69, for "sttructure" read -- structure --.

Signed and sealed this 23rd day of October 1962.

(SEAL)
Attest:

ERNEST W. SWIDER
Attesting Officer

DAVID L. LADD
Commissioner of Patents